US009191843B2

(12) United States Patent
Pulini et al.

(10) Patent No.: US 9,191,843 B2
(45) Date of Patent: Nov. 17, 2015

(54) APPARATUS AND METHOD FOR MEASURING AND REPORTING REDUNDANT WIRELESS CONNECTIVITY OVER TIME

(71) Applicant: Honeywell International, Inc., Morristown, NJ (US)

(72) Inventors: Christopher Pulini, Ambler, PA (US); Norman R. Swanson, Douglassville, PA (US)

(73) Assignee: Honeywell International Inc., Morris Plains, NJ (US)

( * ) Notice: Subject to any disclaimer, the term of this patent is extended or adjusted under 35 U.S.C. 154(b) by 105 days.

(21) Appl. No.: 13/947,951

(22) Filed: Jul. 22, 2013

(65) Prior Publication Data
US 2014/0370820 A1 Dec. 18, 2014

Related U.S. Application Data

(60) Provisional application No. 61/834,000, filed on Jun. 12, 2013.

(51) Int. Cl.
H04B 17/00 (2015.01)
H04W 24/08 (2009.01)
(Continued)

(52) U.S. Cl.
CPC ......... *H04W 24/08* (2013.01); *H04L 12/40176* (2013.01); *H04L 43/045* (2013.01); *H04L 43/06* (2013.01); *H04L 43/0811* (2013.01); *H04L 67/36* (2013.01); *H04L 67/12* (2013.01)

(58) Field of Classification Search
CPC ............... H04L 12/40176; H04L 43/0811; H04W 24/08
USPC ............................................. 455/67.11, 67.7
See application file for complete search history.

(56) References Cited

U.S. PATENT DOCUMENTS 6,437,692 B1 8/2002 Petite et al.
6,847,316 B1 1/2005 Keller
(Continued)

FOREIGN PATENT DOCUMENTS

DE 103 14 721 A1 11/2004
EP 1 401 171 A2 3/2004
(Continued)

OTHER PUBLICATIONS

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.
(Continued)

Primary Examiner — Ayodeji Ayotunde

(57) ABSTRACT

A method includes identifying an amount of time that a wireless device has or does not have redundant connectivity in a wireless network during a specified time period. The method also includes identifying a redundant wireless connection availability of the wireless device during the specified time period. Identifying the amount of time that the wireless device has or does not have redundant connectivity could include identifying connection events associated with the wireless device. The connection events can include events in which a wireless connection with the wireless device is formed and events in which a wireless connection with the wireless device is dropped. Time periods during which multiple wireless connections with the wireless device exist or do not exist can be identified. Identifying the redundant wireless connection availability could include identifying a percentage of the specified time period during which multiple wireless connections with the wireless device exist.

22 Claims, 4 Drawing Sheets

(51) Int. Cl.
*H04L 12/26* (2006.01)
*H04L 29/08* (2006.01)
*H04L 12/40* (2006.01)

(56) References Cited

U.S. PATENT DOCUMENTS

| | | | |
|---|---|---|---|
| 2002/0038373 A1* | 3/2002 | Border et al. | 709/230 |
| 2002/0120671 A1 | 8/2002 | Daffner et al. | |
| 2002/0122230 A1 | 9/2002 | Izadpanah et al. | |
| 2004/0230899 A1 | 11/2004 | Pagnano et al. | |
| 2004/0259533 A1 | 12/2004 | Nixon et al. | |
| 2005/0059379 A1 | 3/2005 | Sovio et al. | |
| 2005/0141553 A1 | 6/2005 | Kim et al. | |
| 2005/0228509 A1 | 10/2005 | James | |
| 2007/0073861 A1 | 3/2007 | Amanuddin et al. | |
| 2007/0153677 A1 | 7/2007 | McLaughlin et al. | |
| 2007/0237137 A1 | 10/2007 | McLaughlin | |
| 2007/0280178 A1 | 12/2007 | Hodson et al. | |
| 2008/0074993 A1 | 3/2008 | Vainola | |
| 2008/0227402 A1* | 9/2008 | Kaneda et al. | 455/68 |
| 2008/0279155 A1 | 11/2008 | Pratt, Jr. et al. | |
| 2009/0037998 A1 | 2/2009 | Adhya et al. | |
| 2009/0059814 A1* | 3/2009 | Nixon et al. | 370/254 |
| 2009/0060192 A1 | 3/2009 | Budampati et al. | |
| 2010/0070634 A1 | 3/2010 | Ranjan et al. | |
| 2010/0118711 A1 | 5/2010 | Cankaya et al. | |
| 2012/0052814 A1* | 3/2012 | Gerber et al. | 455/67.11 |

FOREIGN PATENT DOCUMENTS

| | | |
|---|---|---|
| EP | 1 401 171 A3 | 3/2004 |
| EP | 2066142 A2 | 6/2009 |
| EP | 2066142 A3 | 8/2009 |
| GB | 2 427 329 A | 12/2006 |
| WO | WO 01/35190 A2 | 5/2001 |
| WO | WO 01/35190 A3 | 5/2001 |
| WO | WO 03/079616 A1 | 9/2003 |
| WO | WO 03/089995 A2 | 10/2003 |
| WO | WO 2004/032392 A2 | 4/2004 |
| WO | WO 2004/047385 A2 | 6/2004 |
| WO | WO 2006/017994 A1 | 2/2006 |
| WO | WO 2006/053041 A1 | 5/2006 |

OTHER PUBLICATIONS

International Search Report and Written Opinion of the International Searching Authority in PCT Application No. PCT/US2007/069717 dated Dec. 10, 2007.
International Search Report and Written Opinion of the International Searching Authority in PCT Application No. PCT/US2007/069614 dated Nov. 22, 2007.
International Search Report and Written Opinion of the International Searching Authority in PCT Application No. PCT/US2007/069710 dated Nov. 27, 2007.
International Search Report and Written Opinion of the International Searching Authority in PCT Application No. PCT/US2007/069705 dated Apr. 15, 2008.
Pereira, J.M. Dias, "A Fieldbus Prototype for Educational Purposes", IEEE Instrumentation & Measurement Magazine, New York, NY vol. 7, No. 1, Mar. 2004, p. 24-31.
Service Manual SmartRadar FlexLine; Honeywell Enraf; http://www.honeywell.com/ps; 2012; 4 pages.
Screenshot of Honeywell OneWireless R120 user interface, released Jun. 2009; 1 page.
U.S. Appl. No. 12/762,215, filed Apr. 16, 2010; entitled: "Gateway Supporting Transparent Redundancy in Process Control Systems and Other Systems and Related Method"; 57 pages.
Extended European Search Report dated Oct. 15, 2014 in connection wih European Patent Application No. H0040687-0104; 6 pages.

* cited by examiner

APPARATUS AND METHOD FOR MEASURING AND REPORTING REDUNDANT WIRELESS CONNECTIVITY OVER TIME

CROSS-REFERENCE TO RELATED APPLICATION AND PRIORITY CLAIM

This application claims priority under 35 U.S.C. §119(e) to U.S. Provisional Patent Application No. 61/834,000 filed on Jun. 12, 2013, which is hereby incorporated by reference in its entirety.

TECHNICAL FIELD

This disclosure relates generally to wireless communication systems. More specifically, this disclosure relates to an apparatus and method for measuring and reporting redundant wireless connectivity over time.

BACKGROUND

Wireless networks are frequently used in industrial process control systems. For example, a process control system often includes sensors that provide measurements over a wireless network and actuators that receive control signals over the wireless network. A process controller can use the measurements from the sensors to generate the control signals for the actuators.

A wireless device may connect to a wireless network using one or more connections to one or more parent access points or routers. Redundant wireless connectivity to a network provides increased availability and reliability compared to non-redundant connectivity. Current wireless systems often support multiple connections between a wireless device and its parent access points or routers within a network. Connections may be used for various purposes, such as process data publication, request/response communications, message routing, and clock synchronization. Each connection may have one or more purposes. In an optimal network, redundant connections are formed for each purpose.

SUMMARY

This disclosure provides an apparatus and method for measuring and reporting redundant wireless connectivity over time.

In a first embodiment, a method includes identifying an amount of time that a wireless device has or does not have redundant connectivity in a wireless network during a specified time period. The method also includes identifying a redundant wireless connection availability of the wireless device during the specified time period.

In a second embodiment, an apparatus includes at least one processing device configured to (i) identify an amount of time that a wireless device has or does not have redundant connectivity in a wireless network during a specified time period and (ii) identify a redundant wireless connection availability of the wireless device during the specified time period. The apparatus also includes at least one memory configured to store the redundant wireless connection availability.

In a third embodiment, a non-transitory computer readable medium embodies a computer program. The computer program includes computer readable program code for identifying an amount of time that a wireless device has or does not have redundant connectivity in a wireless network during a specified time period. The computer program also includes computer readable program code for identifying a redundant wireless connection availability of the wireless device during the specified time period.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
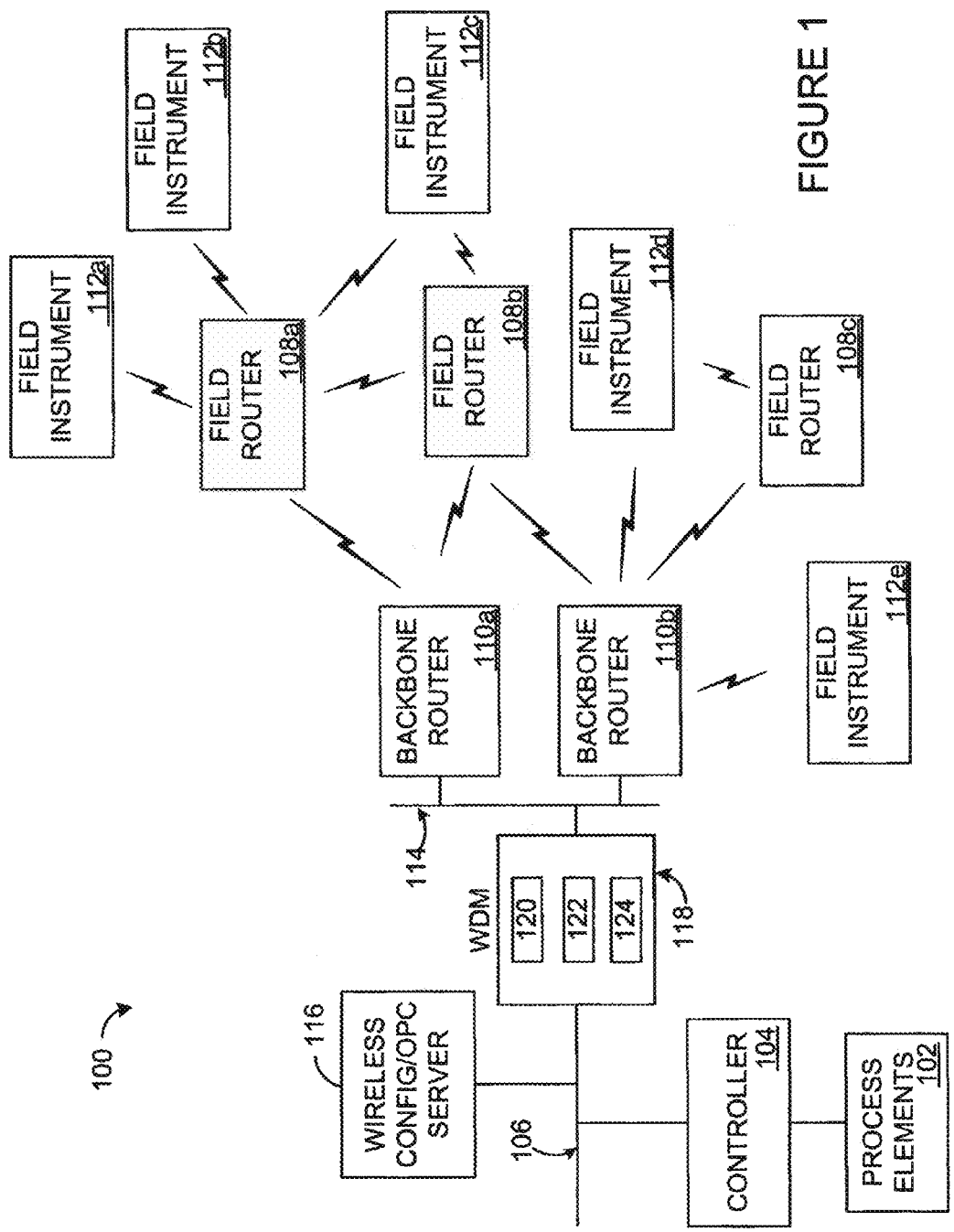
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100 Wireless or WirelessHART.

In this example, the field routers 108a-108c and backbone routers 110a-110b generally represent routing devices that store and forward messages for other devices. Field routers 108a-108c may be battery-powered or otherwise locally powered, and backbone routers 110a-110b may be line-powered or receive operating power from external sources (such as AC supply lines). However, each field or backbone router could be powered in any suitable manner. The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. In particular embodiments, the field routers 108a-108c could represent field device access points (FDAPs) that are not connected via wired Ethernet and may be locally powered, and the backbone routers 110a-110b could represent FDAPs that are connected via wired Ethernet and may be line powered. The backbone network 114 includes any suitable network for transporting data, such as a FAULT TOLERANT ETHERNET network, a wireless mesh network, or other wired or wireless network.

A wireless configuration and OLE for Process Control (OPC) server 116 can configure and control various aspects of the system 100 via a wireless device manager (WDM) 118. For example, the server 116 allows for the control of process elements 102 via the controller 104 and via the WDM 118, which configures the operation of the field routers 108a-108c, backbone routers 110a-110b, and field instruments 112a-112e. The server 116 could also support security in the system 100, such as by allowing for the WDM 118 to distribute cryptographic keys or other security data to various wireless devices or other components. The server 116 includes any suitable structure for operating industrial control and automation system 100.

The WDM 118 supports various functional components used to manage and interact with a wireless network. For example, the WDM 118 can include a gateway 120, a security manager 122, and a system manager 124. The gateway 120 performs various translation functions, allowing information to be exchanged between networks using different protocols. For instance, the gateway 120 could translate between one or more wired Ethernet protocols and one or more wireless protocols. The security manager 122 performs various security-related functions, such as functions to allow only authorized traffic to flow between the networks 106, 114. The system manager 124 performs various management functions to manage a wireless network. For example, the system manager 124 could collect information and identify redundant wireless connectivity over time. The system manager 124 can also be responsible for choosing communication paths for each device and managing any resources needed to communicate over the wireless network (such as by allocating communication slots and coordinating slot allocations between different devices).

Each functional component 120-124 in the WDM 118 could be implemented in any suitable manner. For example, each functional component 120-124 could be implemented using hardware or a combination of hardware and software/firmware instructions. Also, hardware can be shared between the functional components 120-124, such as when the same processing devices are used to execute instructions of the functional components 120-124. While shown as forming part of a single WDM 118, one or more functional components 120-124 could be implemented as separate components.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multifunctional, plant-wide coverage for wireless sensing, asset location tracking, personnel tracking, wireless communications, and any other or additional functionality as desired.

As noted above, various devices in a wireless network have the ability to communicate over redundant wireless connections with their parent access points or routers. In FIG. 1, for example, the field instrument 112c could have redundant connections to the field routers 108a-108b. Redundant wireless connections are often desirable because they help to increase the reliability of the wireless network. For instance, a failure of or interference in one wireless connection may not prevent a device from transmitting or receiving data over the wireless network using another wireless connection.

Some conventional systems indirectly report only the current connectivity status for each device in a wireless network. This may allow, for example, a user to determine whether each device currently has non-redundant connectivity or redundant connectivity. However, a problem can occur if a user wants to know the availability of redundant connectivity over time. Thus, for instance, if redundant connectivity is unavailable every day between the hours of midnight and 6:00 AM, a user would not know if he or she checked the current status of the network at noon daily.

In accordance with this disclosure, the system 100 is configured to track the history of a connection within a wireless network over time. This could be done, for example, by the system manager 124 or other component that can function as a historian.

The system 100 can also calculate the overall redundant connectivity status for each device. An overall redundant connectivity status represents an indication whether a particular device has redundant connectivity. The connectivity status could be calculated at any suitable time(s), such as upon each connection event (like when a connection is formed or when a connection is lost or otherwise dropped). The connectivity status can also be based upon redundant connectivity for each purpose of a communication path, such as whether there are one or more communication paths for process data publication, one or more communication paths for request/response communications, and so on.

The system 100 can then calculate the total time that a device has been connected to a wireless network and the total time that the device has had redundant connectivity. Based upon these calculations, the system 100 can report redundant wireless connection availability as a percentage (such as time connected redundantly versus total time connected) or other suitable statistic. Note that the values used here can be reset, such as by a user. As a result, a redundant wireless connection availability value can also be calculated using the total time that a wireless device has had redundant connectivity since the last reset and the total time that the device has been connected to a wireless network since the last reset.

This information can be used in any suitable manner. For example, the redundant wireless connection availability for at least one device can be displayed to one or more users within a user interface. Also, a user can generate a connectivity report that lists the redundant wireless connection availability for one or more devices in a network. Devices with unexpectedly low availability values could be highlighted. This allows a user to quickly measure the overall health of a wireless network and to identify any devices that may have redundant connections that frequently break and reform. In particular embodiments, any device with a redundant wireless connection availability below 80% can be colored red, and any device with a redundant wireless connection availability between 80% and 90% can be colored yellow or orange. Additional details are provided below regarding the measuring and reporting of redundant wireless connectivity over time, such as an example graphical display, an example report, and example implementation details.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where the measuring and reporting of redundant wireless connectivity over time can be used. This functionality could be used in any other suitable system.

Figure 2:
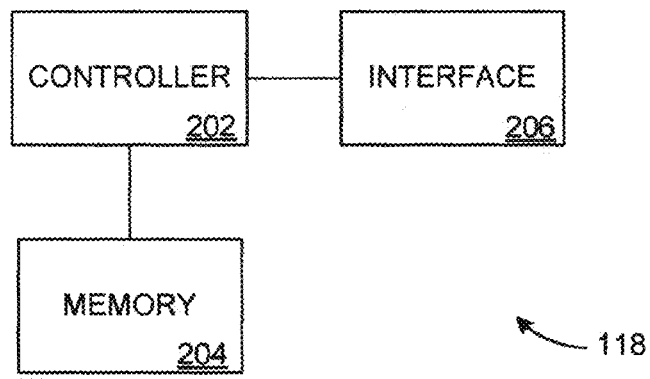
FIG. 2 illustrates an example wireless device manager or other device executing a monitoring application in an industrial control and automation system according to this disclosure.

FIG. 2 illustrates an example wireless device manager (WDM) 118 or other device executing a monitoring application in an industrial control and automation system according to this disclosure. The monitoring application could represent or form at least a part of the system manager 124.

As shown in FIG. 2, the device includes a controller 202, which controls the overall operation of the device. For example, the controller 202 could track the amount of time a device has redundant connectivity in a wireless network, and this could be repeated for any number of devices. The controller 202 can also aggregate this information to determine the redundant wireless connection availability for each device. The controller 202 includes any suitable structure for controlling operation of a device. As particular examples, the controller 202 could represent at least one processor, microprocessor, microcontroller, field programmable gate array, digital signal processor, or other processing or control device.

A memory 204 is coupled to the controller 202. The memory 204 stores any of a wide variety of information used, collected, or generated by the device. For example, the memory 204 could store connection statistics associated with wireless devices. The memory 204 includes any suitable volatile and/or non-volatile storage and retrieval device(s).

The device also includes one or more interfaces 206 configured to communicate with external devices and systems. For example, the interfaces 206 could include one or more Ethernet or other wired network interfaces supporting communications over one or more wired networks (such as the networks 106, 114). The interfaces 206 could also include one or more RF or other wireless network interfaces supporting communications over one or more wireless networks. The interface(s) 206 can be used in any suitable manner, such as to receive information identifying wireless connection statistics or to receive wireless signals for which connection statistics can be calculated. Each interface 206 includes any suitable structure for transmitting and/or receiving signals over a network.

In particular embodiments, the device shown in FIG. 2 can be used to execute a monitoring application that measures and reports redundant wireless connection availability for one or more wireless devices in a wireless network. The monitoring application could identify the redundant wireless connection availability for one device, such as the device on which the monitoring application is executed. The monitoring application could also identify the redundant wireless connection availability for multiple devices, such as a subset or all of the devices in a wireless network.

Although FIG. 2 illustrates one example of a WDM 118 or other device executing a monitoring application in an industrial control and automation system, various changes may be made to FIG. 2. For example, various components in FIG. 2 could be combined, subdivided, or omitted and additional components could be added according to particular needs.

Figure 3:
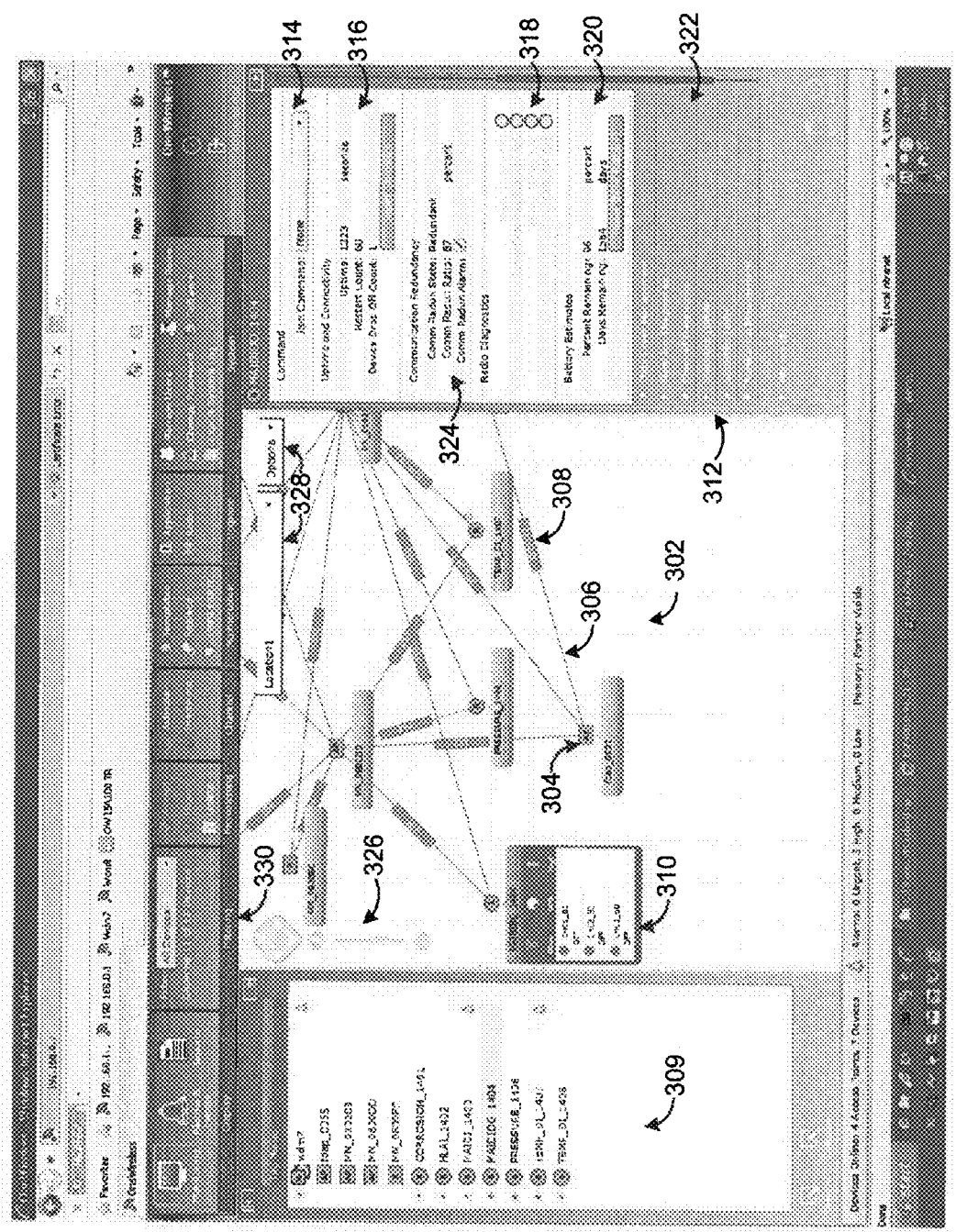
FIG. 3 illustrates an example graphical display for reporting redundant wireless connectivity according to this disclosure.

FIG. 3 illustrates an example graphical display 300 for reporting redundant wireless connectivity according to this disclosure. The graphical display 300 represents one example way in which redundant communication availability could be used. The graphical display 300 could be generated by any suitable device or system (such as the system manager 124) and presented on any suitable device or system (such as a control room display screen).

As shown in FIG. 3, the graphical display 300 includes a network map 302, which identifies nodes of a wireless network and communication paths between those nodes. In this example, the network map 302 includes various icons 304 representing the network nodes and various lines 306 representing communication paths between those nodes. Note that this represents one example of a network map 302 and that the network map 302 can include any number of nodes and communication paths in any suitable arrangement.

Each line 306 representing a communication path can include a label 308. Each label 308 in this example includes one or more statistical values for the associated communication path, such as one or more Received Signal Quality Indicator (RSQI), Received Signal Strength Indication (RSSI), or transmit success/fail ratio values. If multiple values are present in a single label 308, the values can be associated with communications in different directions within the same path (such as one value for A-to-B communications and another value for B-to-A communications).

The graphical display 300 also includes a list 309 of the wireless devices contained within the network map 302. Each device identified in the list 309 could be selected to highlight that device in the network map 302.

If one of the wireless devices in the network map 302 or the list 309 is selected by a user (such as via a mouse, touchscreen, or other input device), a pop-up window 310 can be displayed in proximity to the selected device. The pop-up window 310 displays various information about the selected wireless device and its wireless connection(s). In this example, the pop-up window 310 includes the selected wireless device's transmission interval (30 seconds), bandwidth currently used (38%), battery life ("high"), and wireless channels. However, any other or additional information could be presented in the pop-up window 310.

A control panel 312 can also be displayed when one of the wireless devices is selected by a user. The control panel 312 includes various controls for configuring the associated wireless device and information about the associated wireless device. In this example, the control panel 312 includes a section 314 in which commands can be issued for the associated wireless device to disjoin a wireless network or restart and rejoin the wireless network. Another section 316 in the control panel 312 provides various uptime and connectivity statistics for the associated wireless device. Yet another section 318 identifies any faults detected with the associated wireless device. Still another section 320 provides various power supply-related statistics for the associated wireless device. Additional tabs 322 can be selected in order to view additional information and options for the associated wireless device.

The control panel 312 also includes a section 324 related to redundant connectivity of the associated wireless device in the wireless network. Here, the section 324 identifies whether the associated wireless device currently has redundant wireless connectivity. The section 324 also identifies the redundant wireless connection availability for the associated wireless device over time. The connection availability is expressed here as a percentage, although it could be expressed in other numerical values (such as hours/minutes for the past day) or non-numerical values (such as "good," "fair," or "poor"). The section 324 further gives a user the option of generating an alarm when redundant connectivity is lost.

The system manager 124 or other device can have any suitable data structures that support the identification or use of redundant wireless connection availability values for one or more devices in a wireless network. For example, the data structures shown in Table 1 could be supported by the system manager 124 or another device. Note, however, that the details shown in Table 1 are for illustration only and that other data structures could be used by the system manager 124 or another device.

TABLE 1

| Name | Value | Data Type | Description |
|------|-------|-----------|-------------|
| COMMREDUNRATIO kSmCommRedunRatio | Communication Redundancy Ratio | Type: UINT8 Classification: Dynamic Accessibility: Read Initial default value: n/a Valid value set: [0, 100] NVS: n/a | Identifies the [0, 100] percentage of time that a node has had redundant connectivity. Can be initialized to zero when the node is offline or for access points or other devices for which this may not apply. |
| COMMREDUNSTATE kSmCommRedunState | Communication Redundancy State | Type: UINT8 Classification: Dynamic Accessibility: Read Initial default value: n/a Valid value set: [0, 5] NVS: n/a | Node's current communication redundancy state. 0—Not Applicable 1—Non-Redundant. 2—Non-Redundant with No Secondary Downlink. 3—Non-Redundant with No Secondary Uplink. 4—Non-Redundant with No Secondary Clock. 5—Redundant Can be initialized to zero when the node is offline or for access points or other devices for which this may not apply. |

TABLE 1-continued

| Name | Value | Data Type | Description |
| --- | --- | --- | --- |
| COMMREDUNALARMEN kSmCommRedunAlarmEn | Communication Redundancy Alarm | Type: BOOLEAN Classification: Dynamic Accessibility: Read/Write Initial default value: True Valid value set: [True, False] NVS: n/a | Enable non-redundant communication alarm. |

Additional controls can also be provided in the graphical display 300. For example, controls 326 allow a user to navigate up, down, left, and right in the network map 302 and to zoom in and zoom out within the network map 302. Controls 328 allow a user to select different network maps 302 and to control various options of each network map 302. Some of the options accessible via the controls 328 can include creating a new network map 302, editing or deleting an existing network map 302, and controlling which devices are included in a network map 302. Other options accessible via the controls 328 can include controlling an opacity of a network map 302, controlling whether grid lines are displayed in a network map 302, and controlling whether a network map 302 is locked in order to prevent changes to the map. Still other options accessible via the controls 328 can include controlling which statistical values (if any) are shown in the labels 308 of a network map 302 and controlling which communication paths (such as all, none, only routing, or only time synchronization connections) are shown in a network map 302.

Controls 330 provide a wide range of controls related to the network map 302 and to various process control-related functions. Examples of the types of controls 330 that could be used with the network map 302 include filtering the type(s) of device(s) shown in the network map 302. The controls 330 also allow a user to view alarms and reports related to a wireless network.

Although FIG. 3 illustrates one example of a graphical display 300 for reporting redundant wireless connectivity, various changes may be made to FIG. 3. For example, the layout and arrangement of the graphical display 300 are for illustration only. Also, the contents of the pop-up window 310 and the control panel 312 could vary depending on particular needs.

Figure 4:
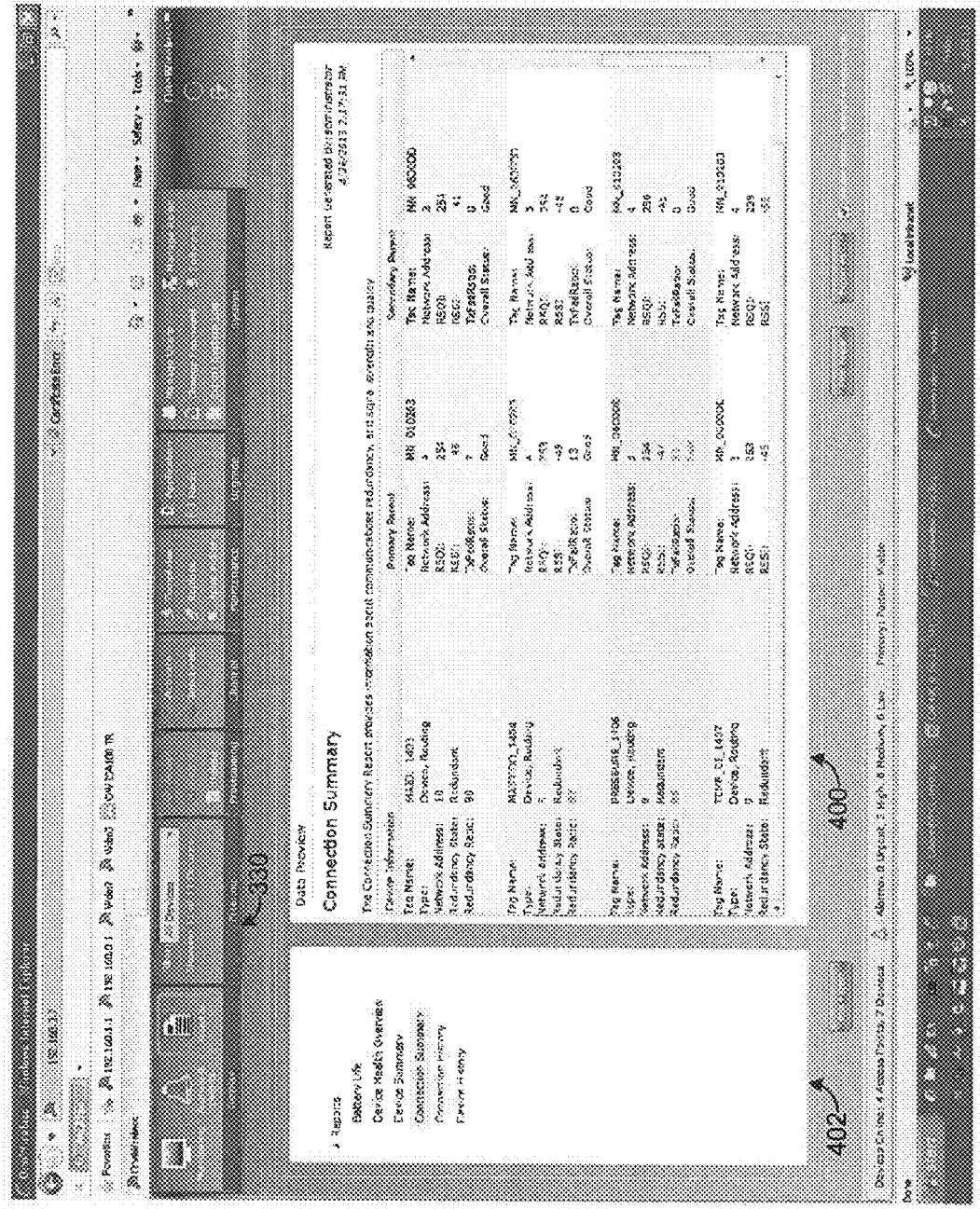
FIG. 4 illustrates an example report for disclosing or using redundant wireless connectivity according to this disclosure.

FIG. 4 illustrates an example report 400 for disclosing or using redundant wireless connectivity according to this disclosure. The report 400 here is shown as being accessed through the "Reports" button in the controls 330 of the graphical display 300. However, the report 400 could be accessed in any other suitable manner.

As shown in FIG. 4, the report 400 represents a "Connection Summary" report. This report 400 provides a user with detailed information about communication paths for devices that are joined in a given network or portion thereof. The report 400 includes an indication of whether a particular wireless device currently has redundant connectivity and, if so, information about both the primary and secondary parent nodes for the wireless device. The parent nodes represent the nodes that receive redundant communications from the particular wireless device.

The report 400 also includes the redundant wireless connection availability values for the wireless devices. These availability values identify the status of the redundant wireless connections for the wireless devices over time. Various cells could be highlighted or otherwise identified based on the availability values. As described above, for example, any device with a redundant wireless connection availability below 80% can be colored red, and any device with a redundant wireless connection availability between 80% and 90% can be colored yellow or orange.

The report 400 shown in FIG. 4 represents only one of the reports that could be generated for a user. A menu 402 could be used to select different reports. One, some, or all of those reports could include redundant wireless connection availability values for wireless devices or information based on the redundant wireless connection availability values.

Although FIG. 4 illustrates one example of a report 400 for disclosing or using redundant wireless connectivity, various changes may be made to FIG. 4. For example, the report 400 shown here is for illustration only. The content and arrangement of the report 400 could be varied as desired, and other or additional reports could include the redundant wireless connection availability for one or multiple wireless devices.

Figure 5:
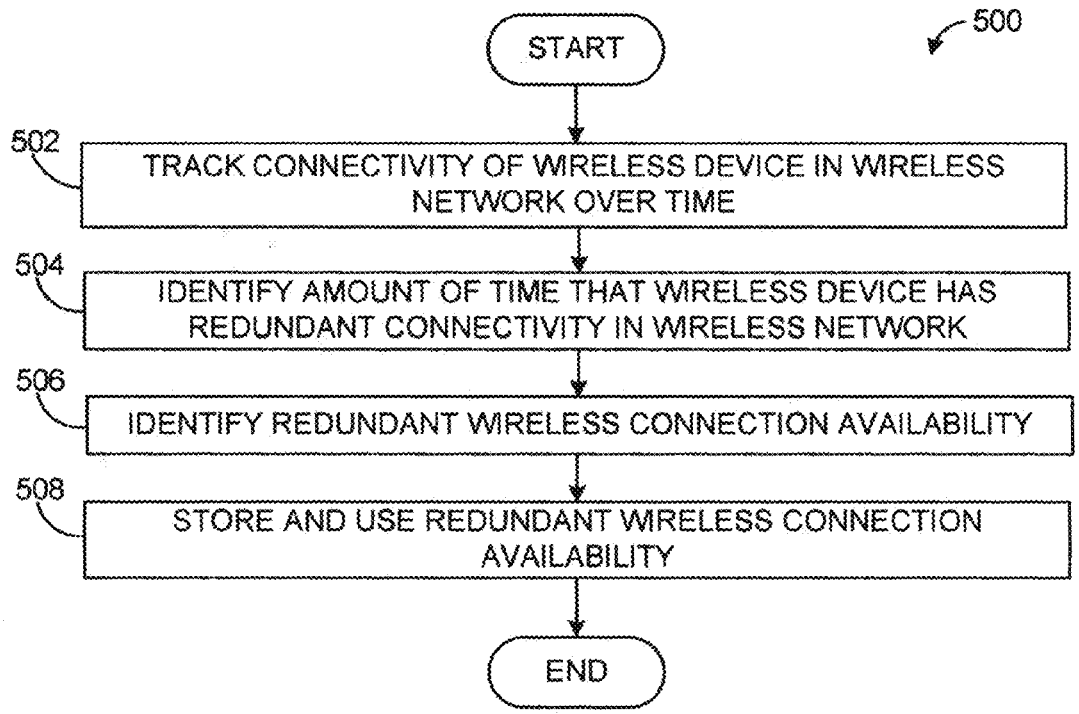
FIG. 5 illustrates an example method for reporting redundant wireless connectivity within a wireless network according to this disclosure.

FIG. 5 illustrates an example method 500 for reporting redundant wireless connectivity within a wireless network according to this disclosure. As shown in FIG. 5, the connectivity of a wireless device in a wireless network is tracked over time at step 502. This could include, for example, a monitoring application supported by the system manager 124 identifying or receiving information defining different connection events associated with a wireless device. The connection events can identify when connections involving the wireless device are formed and lost. From this, the system manager 124 can identify when the wireless device has connectivity and how many connections are supported by the wireless device at any given time.

An amount of time that the wireless device has redundant connectivity in the wireless network during a specified time period is identified at step 504. This could include, for example, the monitoring application identifying the amount of time that the wireless device had simultaneous connections to multiple other devices in the wireless network.

A redundant wireless connection availability value for the wireless device is identified at step 506. This could include, for example, the system manager 124 identifying a percentage by dividing the amount of time identified in step 506 by the specified time period. The system manager 124 could calculate any other suitable value(s) and is not limited to use of percentages. Other possible values could include a ratio of the amount of time identified in step 506 to the specified time period.

The redundant wireless connection availability value is used in some manner at step 508. The specific use depends on the application. For example, the availability value can be included in the graphical display 300 or in a report 400. The system manager 124 could also use the availability value to select communication paths used in the wireless network, such as by switching the communication path(s) used by the wireless device to more stable path(s). The system manager 124 could further trigger an alarm or a maintenance notification if the connection availability is too low.

Although FIG. 5 illustrates one example of a method 500 for reporting redundant wireless connectivity within a wireless network, various changes may be made to FIG. 5. For example, while shown as a series of steps, various steps in FIG. 5 could overlap, occur in parallel, occur in a different order, or occur any number of times. Also, the method 500 could be performed for any number of devices in a wireless network.

Note that while various figures and the above description have described the calculation of one redundant wireless connection availability value for a wireless device, multiple connection availability values could also be calculated for a wireless device. For example, as noted above, wireless connections may be used for various purposes, such as process data publication, request/response communications, message routing, and clock synchronization. The system manager 124 or other component could calculate a redundant wireless connection availability value for each of these purposes. These values need not necessarily be the same for a wireless device. As another example, a single redundant wireless connection availability value could be calculated for a device. That availability value could be based on the amount of time that redundant connections are available for all purposes, such as process data publication, request/response communications, message routing, and clock synchronization. In this example, if redundant connections are not available for all purposes, the wireless device could be viewed as lacking redundant connectivity.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define Or constrain this disclosure. Other changes, substitutions, and alterations are also possible without departing from the spirit and scope of this disclosure, as defined by the following claims.

What is claimed is:

1. A method comprising:
tracking a connectivity of a wireless device in a wireless network over time;
based on the tracked connectivity, identifying an amount of time that the wireless device previously did or did not have redundant connectivity in the wireless network during a specified time period; and
identifying a redundant wireless connection availability of the wireless device during the specified time period using the identified amount of time;
wherein the wireless device communicates over wireless communication paths for multiple purposes; and
wherein the redundant wireless connection availability is based on redundant connectivity for each purpose during the specified time period.

2. The method of claim 1, wherein identifying the amount of time that the wireless device previously did or did not have redundant connectivity comprises:
identifying connection events associated with the wireless device, the connection events comprising events in which a wireless connection with the wireless device was formed and events in which a wireless connection with the wireless device was dropped; and
identifying time periods during which multiple wireless connections with the wireless device did or did not exist.

3. The method of claim 2, wherein identifying the redundant wireless connection availability comprises:
identifying a percentage of the specified time period during which multiple wireless connections with the wireless device existed.

4. The method of claim 1, further comprising:
generating a graphical display, the graphical display including the redundant wireless connection availability.

5. The method of claim 4, wherein:
the graphical display comprises a network map, the network map identifying multiple wireless devices and multiple communication paths between the wireless devices; and
the method further comprises identifying a redundant wireless connection availability for each of the multiple wireless devices.

6. The method of claim 5, further comprising:
upon a selection of one of the wireless devices, providing a user with one or more controls for configuring the selected wireless device.

7. The method of claim 1, further comprising:
generating a report comprising at least one of: the redundant wireless connection availability and information based on the redundant wireless connection availability.

8. The method of claim 1, further comprising:
generating an alarm when the wireless device loses redundant connectivity in the wireless network.

9. An apparatus comprising:
at least one processing device configured to:
- track a connectivity of a wireless device in a wireless network over time;
- based on the tracked connectivity, identify an amount of time that the wireless device previously did or did not have redundant connectivity in the wireless network during a specified time period; and
- identify a redundant wireless connection availability of the wireless device during the specified time period using the identified amount of time; and at least one memory configured to store the redundant wireless connection availability;
wherein the wireless device is configured to communicate over wireless communication paths for multiple purposes; and
wherein the at least one processing device is configured to identify the redundant wireless connection availability based on redundant connectivity for each purpose during the specified time period.

10. The apparatus of claim 9, wherein the at least one processing device is configured to:
- identify connection events associated with the wireless device, the connection events comprising events in which a wireless connection with the wireless device was formed and events in which a wireless connection with the wireless device was dropped; and
- identify time periods during which multiple wireless connections with the wireless device did or did not exist.

11. The apparatus of claim 10, wherein the at least one processing device is configured to identify the redundant wireless connection availability as a percentage of the specified time period during which multiple wireless connections with the wireless device existed.

12. The apparatus of claim 9, wherein the at least one processing device is further configured to:
generate a graphical display including the redundant wireless connection availability.

13. The apparatus of claim 12, wherein:
the graphical display comprises a network map identifying multiple wireless devices and multiple communication paths between the wireless devices; and
the at least one processing device is configured to identify a redundant wireless connection availability for each of the multiple wireless devices.

14. The apparatus of claim 9, wherein the at least one processing device is further configured to:
generate a report comprising at least one of: the redundant wireless connection availability and information based on the redundant wireless connection availability.

15. The apparatus of claim 9, wherein the at least one processing device is further configured to:
generate an alarm when the wireless device loses redundant connectivity in the wireless network.

16. A non-transitory computer readable medium embodying a computer program, the computer program comprising computer readable program code for:
- tracking a connectivity of a wireless device in a wireless network over time;
- based on the tracked connectivity, identifying an amount of time that the wireless device previously did or did not have redundant connectivity in the wireless network during a specified time period; and
- identifying a redundant wireless connection availability of the wireless device during the specified time period using the identified amount of time;

wherein the wireless device is configured to communicate over wireless communication paths for multiple purposes; and
wherein the computer readable program code for identifying the redundant wireless connection availability comprises computer readable program code for identifying the redundant wireless connection availability based on redundant connectivity for each purpose during the specified time period.

17. The computer readable medium of claim 16, wherein the computer readable program code for identifying the amount of time that the wireless device previously did or did not have redundant connectivity comprises computer readable program code for:
- identifying connection events associated with the wireless device, the connection events comprising events in which a wireless connection with the wireless device was formed and events in which a wireless connection with the wireless device was dropped; and
- identifying time periods during which multiple wireless connections with the wireless device did or did not exist.

18. The computer readable medium of claim 17, wherein the computer readable program code for identifying the redundant wireless connection availability comprises computer readable program code for:
identifying a percentage of the specified time period during which multiple wireless connections with the wireless device existed.

19. The computer readable medium of claim 16, wherein the computer program further comprises computer readable program code for:
generating a graphical display, the graphical display including the redundant wireless connection availability.

20. The computer readable medium of claim 16, wherein the computer program further comprises computer readable program code for:
generating a report comprising at least one of: the redundant wireless connection availability and information based on the redundant wireless connection availability.

21. A method comprising:
- tracking a connectivity of a wireless device in a wireless network over time;
- based on the tracked connectivity, identifying an amount of time that the wireless device previously did or did not have redundant connectivity in the wireless network during a specified time period; and
- identifying a redundant wireless connection availability of the wireless device during the specified time period using the identified amount of time;

wherein the wireless device communicates over wireless communication paths for multiple purposes including process data publications, request/response communications, message routing, and clock synchronization; and
wherein the redundant wireless connection availability is based on redundant connectivity for each purpose during the specified time period.

22. The method of claim 21, wherein the redundant wireless connection availability is based on an amount of time that redundant connections were or were not available for all purposes during the specified time period.

* * * * *